Dec. 15, 1925.
W. F. CONKLIN
CLAMP
Filed June 5, 1924
1,566,073
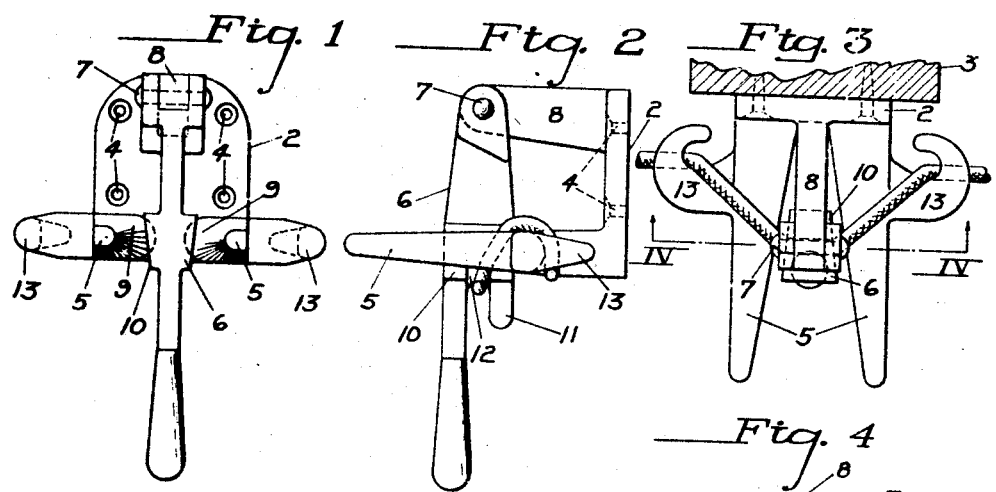
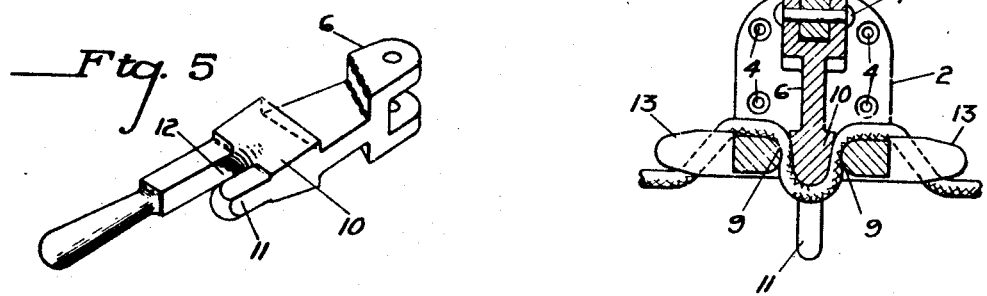
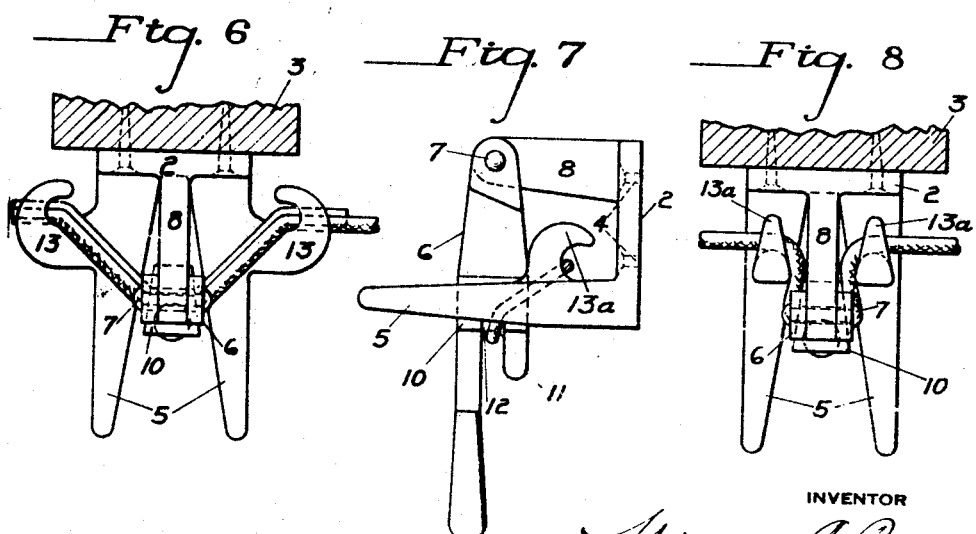
INVENTOR
William F. Conklin
by O. M. Clarke
atty

Patented Dec. 15, 1925.

1,566,073

UNITED STATES PATENT OFFICE.

WILLIAM F. CONKLIN, OF TARENTUM, PENNSYLVANIA.

CLAMP.

Application filed June 5, 1924. Serial No. 718,005.

*To all whom it may concern:*

Be it known that I, WILLIAM F. CONKLIN, a citizen of the United States, residing at Tarentum, in the county of Allegheny and State of Pennsylvania, have invented certain new and useful Improvements in Clamps, of which the following is a specification.

My invention consists of an improvement in rope clamps for temporarily holding one or more rope ends between a movable wedging member and a pair of wedging horns. It is designed for easily and positively engaging a rope, cord, or similiar flexible member, as a clothes line, and for easily and quickly loosening it, as hereinafter described.

In the drawings:

Fig. 1 is a view of the device in front elevation;

Fig. 2 is a side view;

Fig. 3 is a plan view;

Fig. 4 is a cross section on the line IV—IV of Fig. 3;

Fig. 5 is a detached perspective view of the wedging lever;

Fig. 6 is a view similar to Fig. 3, showing the device as used with two ropes or cords;

Fig. 7 is a view similar to Fig. 2, showing a modified arrangement of the guiding hooks; and Fig. 8 is a plan view of Fig. 7.

The device as a whole comprises a base piece 2 for screwing or bolting to a post 3 or other suitable support by screw or bolt holes 4 provided with a pair of integral wedging horns 5, 5, and a wedging lever 6 pivoted at 7 to a forwardly extending bracket 8 of the base 2.

Horns 5 extend forwardly from the base and their inner edges or faces taper inwardly and are rounded as at 9, forming an inwardly converging trackway for the lever 6 and its co-acting wedge portion 10. The wedge portion 10 of the lever is its active gripping portion. Its side faces taper both downwardly and inwardly, so that, as it is thrust inwardly in the arc described from pivoting joint 7, the rope will be clamped between such faces and the opposite embracing tapering and rounded faces of the horns 5.

In order to maintain the rope at all times across faces 10, the lever 6 is provided with an inner prong 11, providing between it and the lever a crotch or socket 12 smoothly rounded and concaved, for positive holding engagement of the rope at all times as the lever is moved.

Outer guiding hooks 13, 13, extend laterally beyond the horns 5 and are smoothly rounded for sliding and holding engagement of the rope, as it is drawn taut before clamping.

When used on a single rope, as in Fig. 3, lever 6 is raised and the rope is inserted in crotch 12, and laid across both horns 5, with the extended line passing through one of the hooks 13, and the other or loose end through the other hook, as in Fig. 3. The rope is now drawn taut to take up the slack between any distant support and the clamp, whereupon the lever 6 is thrust inwardly by the hand.

Owing to the crotch 12 positively engaging the rope, it will be held across the opposite tapering faces of wedge 10, and the inward movement of the lever will swing the opposite wedge faces downwardly and inwardly between the horns, with the intervening rope at each side. Owing to the double taper of the movable wedge, downwardly and inwardly, with angles only slightly more acute than the converging inner faces of the horns, the gripping action on the rope is very powerful and effective, and without any tendency to loosen. Furthermore, as the lever is swung inwardly, the rope will be pulled downwardly between the wedging faces, and against the reaction of the tightened rope, the pull of which tends to maintain the wedging effect.

When two rope ends are gripped for holding oppositely extending ropes, as in clamping the ends of a variously hung clothesline, the effect is the same, the ropes lying side by side across the faces of wedge 10, through and above notch 12, and tightly clamping both in the same manner as with one.

In such application and use, the lever is first swung forward until the crotch is above the horns and the ropes are inserted crosswise and are also inserted through the hooks 13 at each side, as in Fig. 6. The slack is then taken up by pulling the loose ends downward, and when taut, the lever is thrown in as described above.

In Figs. 7 and 8, I show a modified construction in which the hooks 13ª extend upwardly above the horns 5, instead of laterally. Such form is preferable in certain cases, depending on the general direction of the rope or ropes to be tightened, as for instance, on a flagstaff or mast of a boat, with the rope or ropes disposed vertically. It will be understood, of course, that the general function of the hooks 13 or 13ª is for directing or guiding and holding the rope either in a horizontal, vertical, or any other position. Also, that the clamp may be secured and operated with equal success in any position best adapted to exerting the desired tension or withstanding the strain or pull, as on a floor or ceiling.

The device is comparatively simple, consisting of but two main parts which may conveniently be made of cast metal, as aluminum, capable of maintaining its surfaces smooth and uncorroded, and is of low cost and very durable. It may obviously be made to suit various sizes of ropes, cords, etc., while a clamp adapted to hold a three-eighth inch rope will also clamp any smaller size, as an average size cord, merely by pressing the wedge lever inwardly until it makes a wedging grip.

The invention may be variously changed in design, proportions, or otherwise by the skilled mechanic within the scope of the following claims, and may be used in different positions or locations to suit local conditions or adaptations, as the tying of boat painters, hitching animals, etc.

What I claim is:

1. A clamp comprising a base provided with a pair of outwardly diverging horns, a movable wedge member between the horns, and guiding devices for maintaining the article to be clamped between the horns and the wedge member.

2. In combination with rigid lateral members having inwardly converging continuously straight gripping faces, an intervening movable wedge member provided with inwardly and downwardly tapering faces.

3. In combination with a supporting base having a pair of outwardly flaring rounded horns and lateral guiding hooks, a lever pivoted to the base having a middle wedge portion operable between the horns.

4. In combination with a supporting base having a pair of outwardly flaring rounded horns and lateral guiding hooks, a lever pivoted to the base having a middle wedge portion operable between the horns and provided with a guiding crotch.

In testimony whereof I hereunto affix my signature.

WILLIAM F. CONKLIN.